(12) United States Patent
Ichikawa et al.

(10) Patent No.: US 7,810,798 B2
(45) Date of Patent: Oct. 12, 2010

(54) ELECTROMAGNETIC ACTUATOR FOR ACTIVE VIBRATION DAMPING DEVICE

(75) Inventors: Hiroyuki Ichikawa, Kani (JP); Yoshinori Watanabe, Komaki (JP); Takayoshi Yasuda, Iwakura (JP); Motoshi Sakurai, Ama-gun (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 888 days.

(21) Appl. No.: 11/714,739

(22) Filed: Mar. 7, 2007

(65) Prior Publication Data

US 2007/0222128 A1     Sep. 27, 2007

(30) Foreign Application Priority Data

Mar. 8, 2006  (JP) .............................. 2006-063127

(51) Int. Cl.
 *F16F 5/00* (2006.01)
(52) U.S. Cl. ............................. 267/140.14; 267/140.15; 267/140.3
(58) Field of Classification Search ............ 267/140.11, 267/140.13, 140.14, 140.15, 140.3, 140.4, 267/141–141.7
 See application file for complete search history.

(56) References Cited

U.S. PATENT DOCUMENTS 6,315,277 B1 * 11/2001 Nagasawa .............. 267/140.14
6,406,010 B1 * 6/2002 Yano et al. .............. 267/140.14
6,422,546 B1 * 7/2002 Nemoto et al. ......... 267/140.14
7,066,454 B2   6/2006 Kon et al.
2004/0188905 A1 * 9/2004 Goto et al. ............. 267/140.15
2005/0218734 A1  10/2005 Tahara et al.
2006/0001204 A1   1/2006 Kato et al.

FOREIGN PATENT DOCUMENTS

| JP | A 10-306842 | 11/1998 |
| JP | A 2005-172202 | 6/2005 |
| JP | A-2006-055767 | 3/2006 |

OTHER PUBLICATIONS

U.S. Appl. No. 11/640,843; Hiroyuki Ichikawa et al; filed Dec. 19, 2006.

* cited by examiner

*Primary Examiner*—Xuan Lan Nguyen
(74) *Attorney, Agent, or Firm*—Oliff & Berridge, PLC (57) ABSTRACT

An electromagnetic actuator having: a stator and a movable member disposed in a central hole of a coil member of the stator movable in an axial direction; a coupling rod fixed to the movable member; and an elastic stopper having a ring shaped sealing unit at its outer periphery part, a first stopper unit at its center part, a coupling unit that mutually couples the sealing unit and the first stopper unit, and second stopper units located radially between the sealing unit and the first stopper unit at respective circumferential positions. The sealing unit is compressed between the bottom wall of a housing and a lid member to form a sealing mechanism that fluid-tightly close an opening of an adjustment hole. The first stopper unit axially faces the coupling rod bottom with a first separation distance, and the second stopper units axially face the movable member bottom with a second separation distance greater than the first.

6 Claims, 3 Drawing Sheets

ELECTROMAGNETIC ACTUATOR FOR ACTIVE VIBRATION DAMPING DEVICE

INCORPORATED BY REFERENCE

The disclosure of Japanese Patent Application No. 2006-063127 filed on Mar. 8, 2006 including the specification, drawings and abstract is incorporated herein by reference in its entirety.

BACKGROUND OF THE INVENTION

1. Field of the Invention

The present invention relates to an electromagnetic actuator that can be suitably used for active vibration damping devices such as a vibration damping mount, damper or the like that exhibits an active damping effect.

2. Description of the Related Art

In order to reduce vibration in members subject to vibration damping such as an automobile body or the like for which vibration reduction is viewed as important, there are typically employed vibration damping devices such as vibration damping means utilizing attenuation effect of a shock absorber, a rubber elastic body or the like, and vibration insulation means utilizing spring effect of a coil spring, a rubber elastic body or the like. These known vibration damping devices exhibit passive vibration damping effects, so that these known devices are not able to exhibit desired vibration damping effect when frequency characteristics of vibration to be damped varies, or when a higher level of vibration damping effect is required. In light of this, typically used are active vibration damping devices, which are designed to apply excitation or oscillation force to members subject to vibration damping, thereby attenuating vibration in the subject member in an active or cancellation fashion.

The aforementioned active type vibration device needs an actuator for generating oscillation force. To obtain an excellent vibration damping effect, it is important to control the actuator with high precision in terms of frequency and phase of the generated oscillation force. To meet this end, an electromagnetic actuator may be effectively used for the actuator for generating the oscillation force. This electromagnetic actuator typically includes: a stator having a coil with a central through hole and a yoke member disposed around the coil to form a magnetic path; and a movable member having an oscillation rod disposed extending through the through hole of the coil while being movable relative to the stator in the axial direction. Upon energizing the coil, drive force is generated in the axial direction between the stator and the movable member.

When a large impact or the like acts as the external force on the active vibration damping device equipped with this kind of electromagnetic actuator, the movable member may displace excessively, possibly striking against the housing or the like. This striking of the movable member may possibly cause undesirable noise or impacts, leading to undesirable noise or damage of actuator itself.

In order to eliminate the problems of this kind of striking of the movable member on the housing or the like, for example, U.S. Pat. No. 7,066,454 and JP-A-2005-172202 or other documents propose a constitution wherein a rubber sheet for shock absorption is placed on the inner surface of the housing arranged facing the oscillation rod of the electromagnetic actuator. However, this kind of simple rubber sheet may not realize sufficient shock absorption, when a large shock load is applied on the active vibration damping device. Further, the repeated striking of the movable member against the housing may deteriorate the durability of the rubber sheet, leading to damage of rubber sheet it self.

Furthermore, due to reasons of the actuator assembly steps or reasons such as the work when doing various adjustments on the actuator, such as adjustment of the oscillation rod axial direction position or the like, an adjustment hole that pierces through in the axial direction is formed at the portion at which the rubber sheet is placed on the electromagnetic actuator. Through this adjustment hole, if foreign matter such as dust or water or the like penetrates from the outside, smooth excitation displacement of the movable member is deterrent, making it impossible to obtain the initially generated oscillation force, or leading to a deterioration of durability or the like due to erosion or the like. Therefore, it is important that the opening of the adjustment hole is closed fluid-tightly. To meet this end, U.S. Pat. No. 7,066,454 discussed above teaches an installation of an O ring for sealing at part of the outer peripheral surface of a lid member (stopper) fixed by screwing inserted within the through hole of the coil, thereby providing a fluid tight sealing between the lid member and the inner peripheral surface of the through hole. However, this kind of sealing constitution needs a separate sealing rubber, thereby increasing the number of components, possibly leading to a problem of a reduction in productivity and the like.

SUMMARY OF THE INVENTION

It is therefore one object of this invention to provide an electromagnetic actuator for active vibration damping devices of a new constitution, that is able to realize both a stopper mechanism that is excellent for limiting displacement of an oscillation rod when there is excessive external input, and a sealing mechanism of the housing bottom wall part, with a small number of components and a simple constitution.

The above and/or optional objects of this invention may be attained according to at least one of the following aspects of the invention. The following aspects and/or elements employed in each aspects of the invention may be adopted at any possible optional combinations. It is to be understood that the principle of the invention is not limited to these aspects of the invention and combinations of the technical features, but may otherwise be recognized based on the teachings of the present invention disclosed in the entire specification and drawings or that may be recognized by those skilled in the art in the light of the present disclosure in its entirety.

A first aspect of the present invention provides an electromagnetic actuator for active vibration damping device, comprising: a stator including a cylindrical shaped housing with a bottom wall and a coil member disposed within the housing, the housing having an adjustment hole open in a center of the bottom wall; a lid member attached onto the housing so as to cover the adjustment hole; a movable member disposed in a central hole of the coil member so as to be movable in an axial direction, the movable member having an insertion through hole formed piercing on a central axis thereof; a coupling rod inserted through the insertion through hole and positioned in the axial direction in relation to the movable member by a fixing member installed at one axial side of the coupling rod and a biasing member installed at an other axial side of the coupling rod so that oscillation force is applied to the coupling rod from the movable member when the coil member is energized; and an integrally molded stopper that is formed of a rubber elastic body having a ring shaped sealing unit positioned at an outer periphery part, a first stopper unit positioned at a center part, a coupling unit that mutually couples the ring shaped sealing unit and the first stopper unit, and a plurality of second stopper units located radially between the ring shaped sealing unit and the first stopper unit while being independent from one another in a circumferential direction, wherein the integrally molded stopper is superposed and mounted on an inner surface of the lid member such that the ring shaped sealing unit is compressed between the bottom wall of the housing and the lid member to thereby form a sealing mechanism that fluid-tightly close an opening of the adjustment hole, that the first stopper unit is arranged facing in the axial direction to a bottom end of the coupling rod with a first separation distance between axially facing surfaces of the first stopper unit and the coupling rod, that the second stopper units are arranged facing in the axial direction to a bottom edge surface of the movable member with a second separation distance between axially facing surfaces of the second stopper units and the movable member, and that the second separation distance is greater than the first separation distance.

According to the electromagnetic actuator of above described construction for active vibration damping devices, the first stopper unit and the second stopper units of the integrally molded stopper are arranged beneath the coupling rod and the movable member, the displacement in the axial direction of the coupling rod and the movable member are limited by contact with the first stopper unit and the second stopper unit. This arrangement makes it possible, during operation of shock force and the like, to effectively reduce or avoid the occurrence of damage, abnormal sound or the like due to excessive displacement of the coupling rod or the movable member. In addition, since the second separation distance between the facing surfaces of the second stopper units and the movable member is greater than the first separation distance between the facing surfaces of the first stopper unit and the coupling rod, the stopper effect by the contact of the first stopper unit and the coupling rod and the stopper effect by the contact of the second stopper units and the movable member are provided in a stepwise fashion. Thus, it is possible to more advantageously obtain a displacement limiting effect with the compound stopper effect of the stopper units.

Further, at the outer periphery part of the integrally molded stopper, the ring shaped sealing unit is formed, and by having grip pressure of the ring shaped sealing unit between the housing bottom wall part and the lid member, the opening of the adjustment hole formed on the bottom wall part of the housing is fluid-tightly closed. With this arrangement, penetration of dust, water or the like from the outside through the adjustment hole is prevented, and it is possible to advantageously improve the operation stability and durability. In particular, by using a integrally molded stopper by integrally molding of the ring shaped sealing unit and the first and second stopper units using a rubber elastic body, it is possible to realize with a single part the sealing function and the stopper function, and while avoiding an increase in the number of parts. This makes it possible to obtain both an effective seal and stopper effect.

In one preferred form of the first aspect of the invention, the ring shaped sealing unit, the coupling unit, and the second stopper unit formed aligning on a plane spreading radially outwardly from a center in a thickness direction of an outer circumferential surface of the first stopper, and the integrally molded stopper is mounted in a state with the ring shaped sealing unit displaced to one side in the thickness direction of the first stopper unit. According to this arrangement, the ring shaped sealing unit is in the state displaced to one side in the thickness direction of the first stopper unit when the integrally molded stopper is mounted between the housing and the lid member, so that the coupling unit that couples the ring shaped sealing unit and the first stopper unit is elastically deformed. Based on this elastic deformation, there is an elastic force effect downward in the axial direction on the first stopper unit which is the center part of the integrally molded stopper. Therefore, the first stopper unit is pressed against the lid member, thereby being stably supported by the lid member fixed to the housing. This makes it possible to obtain a stable desired elastic stopper effect during contact of the coupling rod. Preferably, the thickness dimension of the first stopper unit is greater than the thickness dimension of any of the ring shaped sealing unit, the coupling unit, and the second stopper units.

In another preferred form of the first aspect of the invention, the second stopper unit comprises an elastic abutting unit disposed axially beneath the movable member, and an elastic support unit extending diametrically inwardly from the ring shaped sealing unit for elastically connecting the elastic abutting unit with respect to the ring shaped sealing unit. This arrangement allows the second stopper unit to be less likely to be influenced by the elastic deformation of the first stopper unit, such as floating up, making it possible to have the movable member come into contact against the second stopper at a predetermined position with stability, thereby exhibiting desired shock absorbing effect. Also, when the ring shaped sealing unit is mounted in a state displaced to one side of the thickness direction of the first stopper unit, it is possible to prevent arrangement of the second stopper unit in a state separated from the lid member by forming the second stopper unit so as to be extended out from the ring shaped seal unit side. This makes it possible to advantageously exhibit a stable stopper effect using the second stopper unit. Preferably, the elastic abutting unit has a wall thickness greater than that of the elastic support unit, and is supported in a cantilevered state by the ring shaped sealing unit via the elastic support unit.

In yet another preferred form of the first aspect of the invention, the coupling unit comprises spoke units radially extending at a plurality of circumferential locations to have the first stopper unit and the ring shaped sealing unit coupled integrally by the spoke units, and wherein adjacent ones of the spoke units are circumferentially spaced from one another via hollow parts formed therebetween, and wherein the second stopper units are positioned at centers in the circumferential direction of the hollow parts, respectively. According this preferred form, the second stopper units are positioned at the center between the circumferential direction of the spoke units, making it possible to advantageously avoid inhibition of the elastic deformation of the second stopper unit due to contact with the spoke units, and making it possible to effectively obtain the stopper effect using the second stopper unit.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
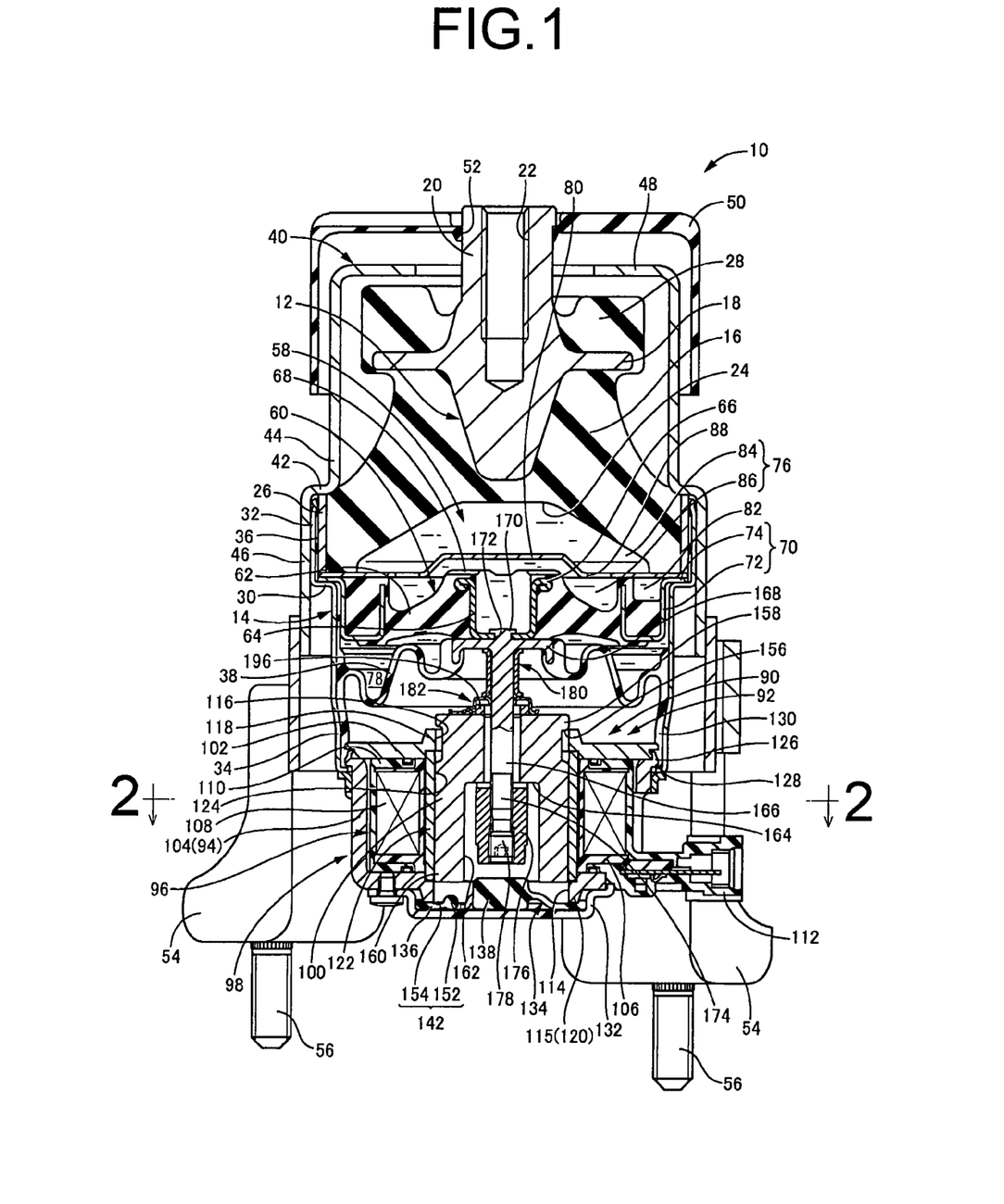
FIG. 1 is an elevational view in axial or vertical cross section of an automotive engine mount equipped with an electromagnetic actuator of construction according to a first embodiment of the present invention, taken along line 1-1 of FIG. 2.

Referring first to FIG. 1, there is shown an automotive engine mount 10 equipped with an electromagnetic actuator 90 of construction according to a first embodiment of the present invention. The engine mount 10 includes a metallic first mounting member 12 and a metallic second mounting member 14, which are positioned in opposition and spaced apart from each other in the axial direction, and elastically connected by means of a main rubber elastic body 16 interposed between them. With the first mounting member 12 attached to a power unit (not shown) and the second mounting member 14 attached to an automobile body (not shown), the power unit is supported on the body in a vibration-damped manner via the engine mount 10. In this installed state, the distributed load of the power unit is exerted on the engine mount 10, across the first mounting member 12 and the second mounting member 14 in the mounting center axis direction, which is the vertical direction in FIG. 1, whereby the main rubber elastic body 16 undergoes elastic deformation in the direction bringing the first mounting member 12 and the second mounting member 14 closer together. The principle vibrations to be damped are also input across the first mounting member 12 and the second mounting member 14, in the directions urging the two mounting members 12, 14 closer together/apart. In the description hereinbelow, unless indicated otherwise, vertical direction refers to the vertical direction in FIG. 1.

To describe in greater detail, the first mounting member 12 has an inverted frustoconical shape. At the large-diameter end of the first mounting member 12, there is integrally formed an annular disk shaped flange portion 18 that projects out on the outer peripheral face. Additionally, an integral fastening shaft 20 projects axially upward from the large-diameter end, with a fixation tapped hole 22 that opens onto the upper end face is formed in the fastening shaft 20. By means of a fastening bolt (not shown) screwed into this fixation tapped hole 22, the first mounting member 12 is attached to the automobile's power unit, not shown.

To the first mounting member 12, there is bonded by vulcanization the main rubber elastic body 16. The main rubber elastic body 16 has a generally frustoconical shape overall, with a diameter gradually increasing as it goes axially downwardly. The first mounting member 12 is partially embedded coaxially into the small-diameter end of the main rubber elastic body 16, and bonded therewith by vulcanization. A center recess 24 of generally inverted mortar shape is formed open in the large diameter end face of the main rubber elastic body 16. Further, a metallic sleeve 26 is disposed about and bonded by vulcanization to the outer circumferential surface of the large-diameter end portion of the main rubber elastic body 16. That is, the main rubber elastic body 16 is formed as an integrally vulcanization molded product incorporating the first mounting member 12 and the metallic sleeve 26. A cushion rubber 28 is provided on the upper face of the flange portion 18 of the first mounting member 12, projecting upward in the axial direction and integrally formed with the main rubber elastic body 16.

The second mounting member 14 has a thin-walled large-diameter, generally cylindrical shape. A shoulder portion 30 is formed in the axially medial portion of the second mounting member 14. To either side of this shoulder portion 30, the side axially above constitutes a large-diameter section 32, while the side axially below constitutes a small-diameter section 34. An inner circumferential surface of the large-diameter section 32 of the second mounting member 14 is substantially entirely covered by a thin seal rubber layer 36 vulcanization bonded thereto. A diaphragm 38 consisting of a thin rubber film which has a generally disk shape imparted with slack is disposed as a flexible film, in proximity to the lower open end of the small-diameter section 34; by means of vulcanization bonding the outer peripheral edge portion of the diaphragm 38 to the inner circumferential surface of the small-diameter section 34 of the second mounting member 14. With this arrangement, the lower open end (i.e. the small-diameter section 34 side) of the second mounting member 14 is provided with fluid-tight closure by means of the diaphragm 38.

The large-diameter section 32 of the second mounting member 14 is disposed about the metallic sleeve 26 bonded onto the outer circumferential surface of the large-diameter end portion of the main rubber elastic body 16, and is firmly fixed thereto by press fitting or by being subjected to a drawing operation or the like. Thus, the second mounting member 14 is fixed to the integrally vulcanization molded product of the main rubber elastic body 16 composed of the first mounting member 12 and the metallic sleeve 26. With this arrangement, the first mounting member 12 and the second mounting member 14 disposed coaxially while being spaced apart from each other in the axial direction (the vertical direction in FIG. 1) in which is input a primary vibrational load to be damped, and elastically connected together by means of the main rubber elastic body 16. With the large-diameter section 32 of the second mounting member 14 fixed onto the main rubber elastic body 16, the axial upper (i.e. the large-diameter section 32 side) opening of the second mounting member 14 is provided with fluid-tight closure by the main rubber elastic body 16.

A stopper metal sleeve 40 is disposed outwardly and fixed onto the second mounting member 14 from the axially upper side. The stopper metal sleeve 40 is of a large-diameter stepped tubular shape, and has a positioning shoulder 42 at axially intermediate portion. To either side of this positioning shoulder 42, the side axially above constitutes a small-diameter section 44, while the side axially below constitutes a large-diameter section 46. This stopper metal sleeve 40 includes an abutting portion 48 integrally formed at its axially upper end, having a form of an inward flange. The large-diameter section 46 of the stopper metal sleeve 40 is radially outwardly disposed and firmly fixed onto the large-diameter section 32 of the second mounting member 14, with the positioning shoulder 42 superposed on an upper end face of the metallic sleeve 26, whereby the stopper metal sleeve 40 is assembled with the integrally vulcanization molded product of the main rubber elastic body 16 while being positioned in the axial direction. With this assembled state, the abutting portion 48 and the cushion rubber 28 are opposed to each other with a given axial spacing interposed therebetween so that the flange portion 18 of the first mounting member 12 comes into contact in the axial direction with the abutting portion 48 in a cushioning manner via the cushion rubber 28. This arrangement provides a rebound stopper mechanism for limiting the axial displacement of the first mounting member 12 relative to the second mounting member 14.

Axially above the stopper metal sleeve 40, there is formed a bound stopper rubber 50 with a given axial spacing therebetween. The bound stopper rubber 50 is of an inverted cup shape overall, and has a through hole 52 perforated through the radially central portion of its roof portion. The fastening shaft 20 of the first mounting member 12 is inserted through the through hole 52 with an inner circumferential surface of the through hole 52 bonded onto the outer circumferential surface of the fastening shaft 20, whereby the bound stopper rubber 50 is fixed to the first mounting member 12. With this arrangement, the relative displacement between the first and second mounting members 12, 14 in the axially and mutually approaching direction can be limited by means of cushion-wise abutting contact between the surface of the roof portion of the bound stopper rubber 50 and the abutting portion 48, thereby providing a bound stopper mechanism in the present embodiment. In the present embodiment, the bound stopper rubber 50 is disposed for covering the upper portion of the small-diameter section 44 of the stopper metal sleeve 40.

On an outer circumferential surface of the axially lower end portion of the stopper metal sleeve 40, there is fixed a plurality of fixation legs 54 extending axially downward, to which a plurality of fixation bolts 56 are fixed, respectively. With the fixation bolts 56 screwed into an automotive body side member (not shown), the second mounting member 14 is fixed to the automotive body via the stopper metal sleeve 40.

Between the opposing faces of the main rubber elastic body 16 and the diaphragm 38 in the second mounting member 14 interior, there is formed a fluid chamber 58 that constitutes a sealed zone fluid-tightly isolated from the outside, with a non-compressible fluid being sealed therein. As the non-compressible fluid sealed therein, there may be employed water, an alkylene glycol, a polyalkylene glycol, silicone oil, or the like. In order to effectively achieve vibration damping action on the basis of fluid flow action, a low-viscosity fluid of 0.1 Pa·s or less will be employed, preferably.

A partition member 60 is assembled within the fluid chamber 58 so as to extend in the axis-perpendicular direction, while being supported by the second mounting member 14. The partition member 60 has a support rubber elastic body 62, which is of an annular disk like shape and which extends in the axis-perpendicular direction with a predetermined thickness. And an oscillation member 64 is bonded by vulcanization to the center portion of this support rubber elastic body 62. The oscillation member 64 is of a cup shape overall, and is bonded by vulcanization at its entire outside peripheral edge to the inside peripheral edge of the support rubber elastic body 62. The oscillation member 64 includes a flange portion in the form of a reinforcing flange 66 integrally formed by bending its opening edge portion radially outwardly. This reinforcing flange 66 is subjected to a rolling operation so that the radially outer peripheral portion is folded back with an arcuate shape in the radially inward direction. This arrangement is effective to prevent cracking in the support rubber elastic body 62, even if burrs are formed at peripheral edge of the reinforcing flange 66. On the upper face of the reinforcing flange 66, the support rubber elastic body 62 has extended with a relatively large thickness, thereby providing a cushioning portion 68.

An outer peripheral fitting 70 is bonded by vulcanization to the outside peripheral edge of the support rubber elastic body 62 so as to extend over an entire circumference, and a grooved portion 72 being open upwardly and extending over an entire circumference to form a groove is formed in the outer peripheral fitting 70. A flange 74 is also integrally formed at an opening edge portion of an outside wall of the grooved portion 72 so as to extend outwardly in the axis-perpendicular direction. The outer peripheral portion of the support rubber elastic body 62 is bonded by vulcanization to an inside wall of the grooved portion 72 in the state that the support rubber elastic body 62 extends into and fills the inside of the grooved portion 72. On the upper side of the support rubber elastic body 62 filling the inside of the grooved portion 72, there is formed a circumferential groove opening upward and extending circumferentially with a length smaller than the circumference of the grooved portion 72.

With this arrangement, the partition member 60 is disposed between axially opposite faces of the main rubber elastic body 16 and the diaphragm 38, while spreading in the axis-perpendicular direction, thereby dividing the fluid chamber 58 within the second mounting member 14 into two parts on the axially both sides thereof. Namely, on the axially upper side of the partition member 60, there is formed a pressure receiving chamber 76 whose wall is partially defined by the main rubber elastic body 16 and generates a fluid pressure fluctuation based on the elastic deformation of the main rubber elastic body 16 upon input of vibrational load. On the axially lower side of the partition member 60, there is formed an equilibrium chamber 78 whose wall is partially defined by the diaphragm 38 and having a variable volume. As will be understood from the aforementioned explanation, the pressure receiving chamber 76 is composed at one wall part of the main rubber elastic body 16, and at another wall part of the partition member 60. Within this pressure receiving chamber 76, there is disposed the oscillation member 64 with attached in a displaceable fashion in the axial direction with respect to the second mounting member 14 via the support rubber elastic body 62.

Further a partitioning plate 80 is mounted from the above on the support rubber elastic body 62. The partitioning plate 80 has a generally disk like shape and is directly superposed at its outer peripheral portion onto the flange 74 of the outer peripheral fitting 70. Both outer peripheral edges of the mutually superposed partitioning plate 80 and the flange 74 are mounted on the shoulder portion 30 of the second mounting member 14, and are sandwiched between the shoulder portion 30 and the metallic sleeve 26 fitted into the second mounting member 14, thereby being supported by the second mounting member 14.

With this assembly state, the outer peripheral edges of the partitioning plate 80 is held in close contact on the upper face of the support rubber elastic body 62 fitting the grooved portion 72 of the outer peripheral fitting 70. On the other hand, the central portion of the partitioning plate 80 is disposed with a distance above a wide area located radially inwardly of the outer peripheral fitting 70 of the support rubber elastic body 62.

Further, the opening of the aforementioned circumferential groove is fluid-tightly closed, thereby providing a tunnel like passage extending circumferentially with a length slightly smaller than one circumference. One open end of the tunnel like passage is held in communication with the pressure receiving chamber 76 through a hole (not shown) perforating the partitioning plate 80, and the other end of the tunnel like passage is held in communication with the equilibrium chamber 78 through a hole (not shown) perforating the bottom wall of the grooved portion 72. That is, by utilizing the tunnel like passage, there is provided an orifice passage 82 permitting a fluid communication between the pressure receiving chamber 76 and the equilibrium chamber 78. Upon input of a specific vibration, the flow of the fluid through the orifice passage 82 will occur based on the pressure difference between the pressure receiving chamber 76 and the equilibrium chamber 78, thereby exhibiting vibration damping effect on the basis of resonance of the fluid flowing through the orifice passage 82. In this embodiment, for example, the orifice passage 82 is tuned by adjusting its length or its cross sectional area appropriately so that it exhibits damping effect with respect to a low frequency vibration such as engine shake at around 10 Hz.

With the partitioning plate 80 disposed within the pressure receiving chamber 76 in the state extending in the axis-perpendicular direction, the pressure receiving chamber 76 is divided into axially both sides of the partitioning plate 80. Namely, on the upper side of the partitioning plate 80, there is formed a working fluid chamber 84 whose wall is partially defined by the main rubber elastic body 16. On the lower side of the partitioning plate 80, there is formed an excitation chamber 86 whose wall is partially defined by the oscillation member 64. Since the partitioning plate 80 includes a plurality of perforated holes 88 formed on its radially intermediate portion at respective circumferential locations, the working fluid chamber 84 and the excitation chamber 86 are held in mutual communication.

Axially below the second mounting member 14, i.e. on the opposite side of the oscillation member 64 remote from the pressure receiving chamber 76, there is disposed an electromagnetic actuator 90 serving as a solenoid operated actuator. This electromagnetic actuator 90 is fixed to the second mounting member 14.

Figure 2:
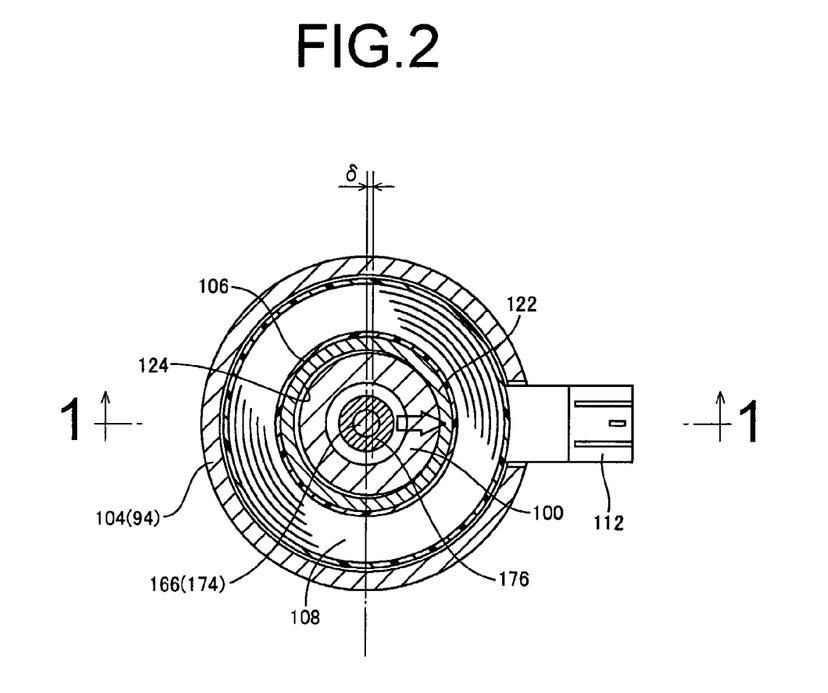
FIG. 2 is a transverse cross sectional view of the electromagnetic actuator of FIG. 1, taken along line 2-2 of FIG. 1.

As illustrated in FIGS. 1 and 2, the electromagnetic actuator 90 includes a solenoid 92, and a housing 94 supporting the solenoid 92 housed therein. More specifically, the solenoid 92 is composed of a stator including a magnetic pole forming member 98 comprising a coil member 96, and an armature 100 serving as a movable member of thick walled generally round disk shape, positioned so as to be capable of relative displacement in the axial direction with respect to the coil member 96. In this embodiment in particular, the housing 94 is not a separate independent member. Instead, a lower yoke 104 that constitutes part of the magnetic pole forming member 98 serves as the housing 94 and the stator includes the coil member 96 and the housing 94.

The magnetic pole forming member 98 is composed of the coil member 96, and an upper yoke 102 and the lower yoke 104 which are attached about the perimeter of the coil member 96. Additionally, the coil member 96 has a coil 108 wrapped around a bobbin 106, with a cover member 110 of nonmagnetic material disposed covering the outside periphery of the coil 108. This cover member 110 has integrally formed therein a power supply opening 112 which projects to the outside from an opening made through the lower yoke 104, and power is supplied to the coil 108 via a terminal disposed within the power supply opening 112. The driving voltage having frequency components supplied to the coil 108 is not limited to alternating current, with pulsating current being acceptable as well, and control is not limited to analog, but may be digital instead.

The lower yoke 104 which serves as the housing 94 has a lower through hole 114 serving as an adjustment hole made in the center portion thereof, and is formed with an "L" shaped cross section extending substantially all the way around the circumference so as to enclose the outer circumferential surface and the lower end face of the coil member 96. At an opening edge portion of the lower through hole 114 of the lower yoke 104, there is formed a tube shaped clamped protrusion 115 projecting axially outwardly. The upper yoke 102 is disposed on the upper end face of the coil member 96. The upper yoke 102 is formed with a general disk shape having an upper through hole 116 of diameter dimension approximately equal to the lower through hole 114 of the lower yoke 104, with the edge on the inner circumferential side being made somewhat thicker, while the edge on the outer circumferential side is positioned covering the coil member 96, in a state of contact with the upper end of the lower yoke 104. The upper yoke 102 and the lower yoke 104 are constituted as yoke members formed of ferromagnetic material, constituting a stationary side magnetic path through which flows magnetic flux produced by supply of current to the coil 108, while the inside peripheral edge portions of the upper through hole 116 and the lower through hole 114 respectively constitute an upper magnetic pole 118 and a lower magnetic pole 120 serving as magnetic pole forming areas where the magnetic poles form when current is supplied to the coil 108.

Within the center hole of the coil 108 constituting the stator, there is installed a guide sleeve 122 arranged so as to cover the openings at the upper and lower inside peripheral edge portions formed by the upper yoke 102 and the lower yoke 104. In this embodiment, the stator is composed to include this guide sleeve 122, and the center hole of the guide sleeve 122 constitutes a tubular guide face 124 serving as a guide hole. That is, the tubular guide face 124 of the guide sleeve 122 is constituted as a tube shaped face slightly smaller in diameter than the magnetic pole inside faces of the upper yoke 102 and the lower yoke 104, and is positioned slightly inward in the diametrical direction from the magnetic pole inside faces of the upper and lower yokes 102, 104. This guide sleeve 122 will preferably be formed of a non-magnetic material, e.g., stainless steel in this embodiment. Alternatively, the guide sleeve 122 may be formed of rigid synthetic resin materials such as polyethylene or polytetrafluoroethylene, or other non-magnetic materials such as aluminum alloy and austenitic high manganese steels. Low-friction materials are suitably used for the guide sleeve 122. The guide sleeve 122 may be fixed with respect to the upper and lower yokes 102, 104, elastically supported, or installed with somewhat of a gap. That is, it suffices for the guide sleeve 122 to smoothly guide the armature 100 in the axial direction, while preventing it from interfering with the upper and lower yokes 102, 104, etc.

On the upper edge portion of the housing 94, there is bended a mating groove 126. A detent piece 128 formed on the lower end of the second mounting member 14 fits into this mating groove 126 and is detained by caulking therein, whereby the magnetic pole forming member 98 of the electromagnetic actuator 90 is attached so as to cover the lower end opening of the second mounting member 14. In this embodiment, the electromagnetic actuator 90 is fastened directly to the second mounting member 14 without interposing any bracket or other separate element, thus reducing positioning deviation of the center axes of the oscillation member 64 and the coil 108 during assembly. Since a clamped rubber element 130 formed by extending the diaphragm 38 downward is clamped between the housing 94 of the electromagnetic actuator 90 and the second mounting member 14, chatter of the electromagnetic actuator 90 is prevented. With this arrangement, the center axis of the coil 108 is substantially aligned with the center axis of the engine mount 10, and coincident with the center axes of the second mounting member 14 and the oscillation member 64.

A shallow dish-like lid member 132 is bolted to the bottom of the housing 94. The lid member 132 includes at its open edge portion an outer flange portion extending outwardly, and a plurality of bolt holes are formed through the outer flange portion at the plurality of circumferential locations. By means of bolts inserted through the bolt holes, the lid member 132 is fixed to the housing 94, thereby closing the lower through hole 114 formed through the housing 94.

Figure 3:
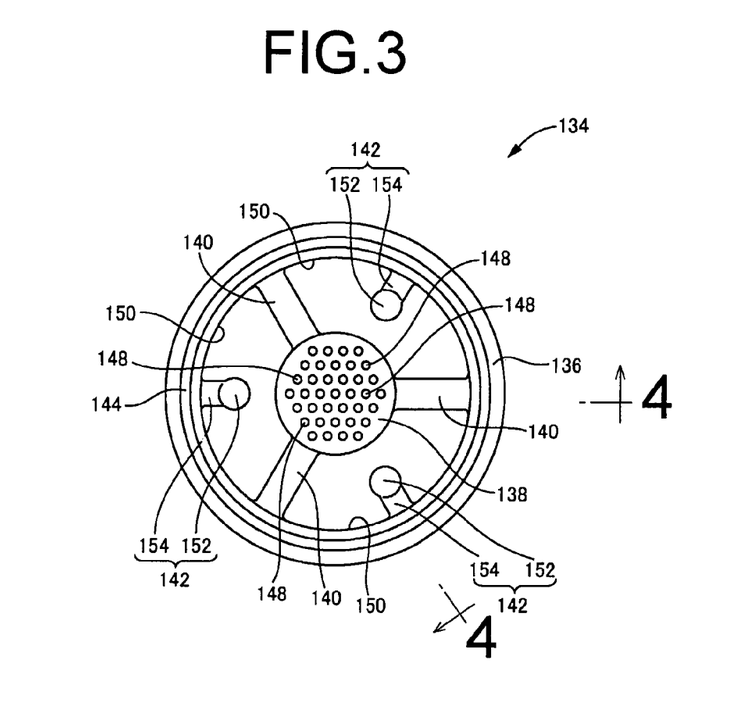
FIG. 3 is a top plane view of an elastic stopper of the electromagnetic actuator of FIG. 1.
Figure 4:
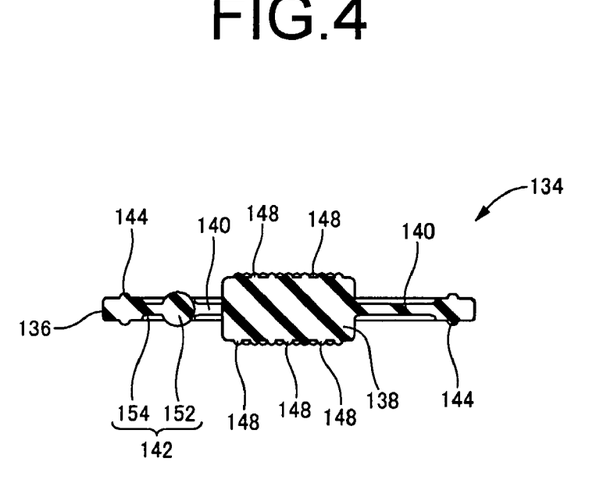
FIG. 4 is an enlarged view in vertical cross section of the elastic stopper of FIG. 3, taken along line 4-4 of FIG. 3.

On the upper surface of the lid member 132, an integrally molded stopper in the form of an elastic stopper 134 is superposed and mounted such that the elastic stopper 134 is compressed between the inner peripheral edge of the lower edge of the housing 94 and the lid member 132. As shown in FIGS. 3 and 4, the elastic stopper 134 is made of a rubber material and has a generally disk plate shape overall. The elastic stopper 134 includes at its outer peripheral portion a ring shaped sealing unit 136 and at its central portion a fist stopper unit in the form of a rod stopper unit 138. The ring shaped sealing unit 136 and the rod stopper unit 138 are mutually connected together by means of a plurality of spoke units in the form of connection spokes 140 that extend in the diametric direction. Within the circumferential spacing formed between adjacent ones of the connection spokes 140, there are formed a plurality of second stopper units in the form of armature stopper units 142 extending from the peripheral surface of the ring shaped sealing unit 136.

More specifically described, the ring shaped sealing unit 136 is formed at the outer peripheral portion of the elastic stopper 134 extending continuously with a generally constant rectangular cross sectional shape over the entire circumference. On the opposite faces of the ring shaped sealing unit 136 in the thickness direction, there are formed sealing projections 144, respectively. The sealing projection 144 is compressed by and between axially opposing faces of the clamped protrusion 115 projecting outward from the inner peripheral portion of the lower edge of the housing 94 and the bottom face of the lid member 132, thereby providing a fluid-tight sealing between superposed surfaces between the lid member 132 and the housing 94. Thus, the opening of the lower through hole 114 of the housing 94 is fluid-tightly closed by the combination use of the lid member 132 and the elastic stopper 134. It should be noted that the ring shaped sealing unit 136 provides the sealing mechanism in the present embodiment.

Inside the ring shaped sealing unit 136, the rod stopper unit 138 is located with a diametrical spacing therebetween. The rod stopper unit 138 is positioned in the generally central portion of the elastic stopper 134, and is of a round disk shape with a thickness great than the ring shaped sealing unit 136. On the opposite faces of the rod stopper unit 138 in the thickness direction, there are formed a multiplicity of cushion projections 148 of semi-circular shape. The cushion projections 148 may have a variety of shapes including a frustoconical shape, a frustopyramidal shape, a circular column shape and the like. In order to effectively moderate shock generated upon collision between an actuating rod 166 and the rod stopper unit 138 (which will be described later), a shape with a gradually decreasing diameter in its projecting direction would be preferably employed.

The ring shaped sealing unit 136 and the rod stopper unit 138 are mutually connected by a plurality of connection spokes 140 each extending straightly in the radial direction between inner circumferential surface of the ring shaped sealing unit 136 and the outer circumferential surface of the rod stopper unit 138, while being spaced away from one another in the circumferential direction by a given interval. In the present embodiment, three connection spokes 140 are arranged in the circumferential direction at equal intervals. These connection spokes 140 are formed at the generally central position in the thickness or axial direction of the ring shaped sealing unit 136 and the rod stopper unit 138, and extend in the axis-perpendicular direction. Between adjacent ones of the connection spokes 140, there are formed hollow parts in the form of weight reducing holes 150 piercing in the thickness direction.

The armature stopper units 142 are disposed between adjacent ones of the connection spokes 140 in the circumferential direction. Each armature stopper unit 142 includes an elastic abutting unit 152 and an elastic support unit 154. The elastic abutting unit 152 has a generally ball shape and integrally connected with the radially inner edge of the elastic support unit 154 that has a plate shape extending radially inwardly from the inner circumferential surface of the ring shaped sealing unit 136. With this arrangement, a plurality of elastic abutting unit 152 are disposed at a radial spacing between the ring shaped sealing unit 136 and the rod stopper unit 138, while the plurality of elastic abutting units 152 are independent from one another in the circumferential direction. In the present embodiment, each elastic abutting unit 152 is positioned at the generally central portion of the corresponding weight reducing hole 150 formed between the circumferential direction of connection spokes 140, so that each elastic abutting unit 152 is located between adjacent connection spokes 140 in the circumferential direction. Namely, three armature stopper units 142 in total are arranged at equal intervals in the circumferential direction. It should be noted that the number and location of the armature stopper units 142 are not limited to the illustrated ones. Preferably, three or more armature stopper units 142 should be formed at equal intervals in the circumferential direction in order to establish a stable abutting condition with respect to the armature 100, which will be described later. Note that the armature stopper units 142 are formed in a circumferentially divided fashion owing to the presence of the weight reducing holes 150 formed between adjacent connection spokes 140 in the circumferential direction. By the help of this arrangement, even if the ring shaped sealing unit 136 is compressed between the housing 94 and the lid member 132, the elastic deformation of the ring shaped sealing unit 136 does not affect the armature stopper units 142 adversely, such as wave-formed deformation.

As shown in FIG. 4, the elastic stopper 134 has the same shape on the front and back. Namely, the ring shaped sealing unit 136, the rod stopper unit 138, the connection spokes 140, and the armature stopper units 142 have identical configuration on their front and back surfaces, respectively, and their centers in the thickness direction are all located on the same plane. When the elastic stopper 134 is installed in position, the ring shaped sealing unit 136 is compressed between the clamped protrusion 115 of the housing 94 and the lid member 132, whereby the sealing unit 136 is displaced axially downwardly. Accordingly, the rod stopper unit 138 is forced or biased in the axially downward direction of the engine mount 10 by means of the restoring force generated as a result of elastic deformation of the connection spokes 140, whereby the rod stopper unit 138 is forcedly pressed against the lid member 132. It should be appreciated that the illustrated biasing means for the rod stopper unit 138 is not necessarily needed to practice the present invention. Alternatively, the back surface of the elastic stopper 134 to be superposed on the lid member 132 is arranged to be previously aligned in the same plane. The number and location of the connection spokes 140 are not limited to the illustrated ones. Preferably, a plurality of connection spokes 140 should be arranged in the circumferential direction at equal intervals in order to realize stable positioning of the rod stopper unit 138.

The armature 100 is assembled within the lower through hole 114 of the housing 94 in which the coil 108 has been installed, in other words, within the center hole of the coil 108. The armature 100 is formed of a ferromagnetic body of generally cylindrical block shape overall, having an outside diameter dimension that is slightly smaller than the inside diameter dimension of the guide sleeve 122. The armature 100 is assembled fitting within the guide sleeve 122 so as to be capable of relative displacement in the axial direction, in an approximately coaxial manner. Additionally, the armature 100 has an axial length dimension that spans the upper and lower magnetic poles 118, 120. In proximity to the upper magnetic pole 118 thereof, there is formed a circumferential groove 156 that opens in the outer circumferential surface. The axial upper end portion and lower end portion of the armature 100 serve as an upper magnetic action part 158 and a lower magnetic action part 160, respectively, which constitute annular magnetic action areas extending entire circumference. As illustrated, for example, magnetic gaps at which effective magnetic attracting force is excited are formed in an appropriate position, between the upper magnetic action part 158 and the upper magnetic pole 118 of the upper yoke 102, and between the lower magnetic action part 160 of the armature 100 and the lower magnetic pole 120 of the lower yoke 104. The outside circumferential surface of the armature 100 is subjected to a low friction treatment or anticorrosion treatment with any of various coating materials known in the art.

The widthwise dimension of the circumferential groove 156 of the armature 100 varies in the circumferential direction, so that the axial position of the lower end face of the upper magnetic action part 158 varies in the circumferential direction. Further, the armature 100 includes at its lower end a shoulder portion whose height dimension varies in the circumferential direction, so that the axial position of the lower end face of the lower magnetic action part 160 varies in the circumferential direction. In short, the lower end face of the upper magnetic action part 158 and the lower end face of the lower magnetic action part 160 are both inclined with respect to the axis-perpendicular direction. The inclination of the both lower end faces of the upper magnetic action part 158 and the lower magnetic action part 160 are made similar in the same circumferential position. As will be apparent form the foregoing description, the lower end portion of the upper magnetic action part 158 (opening edge portion of the circumferential groove 156) and the lower end portion of the lower magnetic action part 160 serve as annular edge portions, in the present embodiment.

The inclined lower end face of the upper magnetic action part 158 and the inclined lower end face of the lower magnetic action part 160 vary in the circumferential direction a space distance between the upper magnetic pole 118 and the lower magnetic pole 120, and vary in the circumferential direction a space distance between the upper magnetic action part 158 and the lower magnetic action part 160. In the present embodiment, the upper end corner of the inner circumferential surface of each of the upper magnetic pole 118 and the lower magnetic pole 120 as well as the lower end corner of the outer circumferential surface of each of the upper magnetic action part 158 and the lower magnetic action part 160 are dominant to the generated magnetic force, since these corners of the upper magnetic pole 118 and the lower magnetic pole 120 are most closely located with respect to the armature 100 in a static state. Then, an axial space distance between these corners varies in the circumferential direction. More specifically, the space distance between the both corners changes in the circumferential direction at a period of 360 degrees in the circumferential direction, so that one circumferential position where the both corners are located closest to each other, and another circumferential position where the both corners are located farthest to each other, are opposed to each other in one axis-perpendicular direction.

This arrangement makes uneven in the axis-perpendicular direction the magnetic attractive force in the axial direction acting between the upper and lower magnetic poles 118, 120 and the armature 100 (upper and lower magnetic action parts 158, 160). As a result, the armature 100 is subjected to the force that is biased in one axis-perpendicular direction indicated by the arrow in FIG. 2, whereby the armature 100 is displaced by a given distance δ in the axis-perpendicular direction relative to the guide sleeve 122. In the present embodiment, by means of the displacement of the armature 100 relative to the guide sleeve 122, the outer circumferential surface of the armature 100 is forcedly pressed onto the tubular guide face 124 of the guide sleeve 122 in the one axis-perpendicular direction. This arrangement, namely, constitutes a magnetic force biasing mechanism (or a bias urging assembly). Alternatively, in the one axis-perpendicular direction in which the resultant force of the magnetic attractive force acts to the armature 100, the armature 100 may be held in non-contact state, i.e. may be slightly spaced away from the tubular guide face 124 of the guide sleeve 122, or alternatively the armature 100 may be held in a line contact against the tubular guide face 124 over its entire axial length. In the present embodiment, the armature 100 is brought into abutting contact with the tubular guide face 124 over the entire axial length.

A through hole 162 serving as an insertion through hole is formed and bored through the center axis in the armature 100. A shoulder face 164 is formed in the axially medial portion of this through hole 162, and to either side of the shoulder face 164, the diameter dimension of the through hole 162 is made smaller on the axially upper side rather than the axially lower side.

An actuating rod 166 serving as a coupling rod is passed through the through hole 162 of the armature 100 with a gap to allow some displacement. This actuating rod 166 has a shaft body shape extending in the axial direction, and is fixed at its upper end portion to the oscillation member 64, while having a flange shaped fixation part 168 integrally formed at its axially intermediate portion. This fixation part 168 is superposed onto the bottom wall of the oscillation member 64 from the axially lower side with its outer peripheral portion bonded to the radially central portion of the diaphragm 38. A caulking part 170 is formed at the upper end of the actuating rod 166, and inserted into a fixation hole 172 formed through the bottom wall portion of the oscillation member 64. By caulking this caulking part 170 against the oscillation member 64, the actuating rod 166 is firmly fixed to the oscillation member 64.

The lower end of the actuating rod 166 projects downward beyond the shoulder face 164 of the armature 100. On this projecting lower end of the actuating rod 166, a thread, thereby constituting a bolt thread portion 174. To the lower end of the actuating rod 166 serving as the bolt thread portion 174, there is screwed up a positioning nut 176 serving as a fixed member. Further, a set screw 178 is tighten on the lower side of the central bore of the positioning nut 176. With this arrangement, the actuating rod 166 is supported by the armature 100 in a manner for preventing the actuating rod 166 from being dislodged from the armature 100 in the axially upward direction. The positioning nut 176 has an outside diameter larger than an inside diameter of the through hole 162 on a portion above the shoulder face 164. By tightening the positioning nut 176, the oscillation member 64 (partition member 60) and the armature 100 are forcedly pressed in a mutually approaching direction in an axis direction of the actuating rod 166, thereby being relatively positioned in the axial direction.

On the actuating rod 166 on the opposite side of the shoulder face 164 from the positioning nut 176, there is externally fitted a tubular spacer member 180 and a plastic deformation member 182 serving as a biasing member, while being located between axially opposite upper end face of the armature 100 and the lower end face of the of the fixation part 168 of the actuating rod 166.

The spacer member 180 is of a generally round tubular member with an inside diameter slightly larger than an outside diameter of the actuating rod 166. The spacer member 180 is externally fitted onto the axially medial portion of the actuating rod 166. Axially opposite ends of the spacer member 180 have a radially outwardly curved shape in axial cross section with a diameter gradually increases. More specifically, the axially upper end of the spacer member 180 is held in abutting contact with the lower end face of the fixation part 168 of the actuating rod 166, while the axially lower end of the spacer member 180 is held in abutting contact with the upper end face of the plastic deformation member 182. This tubular spacer member 180 is formed of a material having a substantial rigidity, preferably is selected from metallic materials like a stainless steel, or high rigid synthetic resin materials. In the present embodiment, the spacer member 180 is a rigid member formed of a stainless steel.

The plastic deformation member 182 is disposed between the lower end portion of the spacer member 180 and the upper end face of the armature 100, while being externally fitted onto the actuating rod 166. More specifically, as shown in FIG. 5, the plastic deformation member 182 includes a top wall portion 184 and a plurality of leg portions 186.

The top wall portion 184 is of an annular disk-like shape, and has a through hole 188 perforating its central portion for an insertion of the actuating rod 166. At the inner rim of the top wall portion 184, there is integrally formed a positioning tubular portion 190 projecting axially outwardly along with the actuating rod 166, over an entire circumference thereof. In this embodiment, the positioning tubular portion 190 is externally fitted onto the actuating rod 166, whereby the plastic deformation member 182 is fixed onto the actuating rod 166 in an externally mounted state. Alternatively, the positioning tubular portion 190 is formed at the inner rim of the top wall portion 184 so as to extend axially upwardly or in the axially both directions.

At the outer rim of the top wall portion 184, there is integrally formed the plurality of leg portions 186. These leg portions 186 are located at respective circumferential positions on the outer rim of the top wall portion 184, while extending axially downward therefrom, and are held in contact at their extending ends with the upper end face of the armature 100. These leg portions 186 consist of inclined legs 192 having a generally rectangular flat plate shape overall while extending diagonally outwardly downward with respect to the axial direction, and stopper legs 194 extending in the axial downward direction with a curved plate shape with a wide given circumferential length. Lower end portions of the inclined legs 192 and the stopper legs 194 are curved with a radially outward curl shape so that both inclined legs 192 and the stopper legs 194 are superposed on the upper end face of the armature 100 at parts of their curved end portions located at axially lowest portion of the plastic deformation member 182. Distal ends of the lower end portions of the inclined legs 192 and the stopper legs 194 are located axially slightly above the upper end face of the armature 100 so as not to be contact with the upper end face of the armature 100. The plastic deformation member 182 of construction as described above has the top wall portion 184 and the several leg portions 186. Therefore, it is possible to make rigid the top wall portion 184 to be superposed against the spacer member 180 in the axial direction in order to effectively ensure axial positioning between the oscillation member 64 and the armature 100, while allowing the leg portions 186 to undergo plastic deformation comparatively readily. In addition, the leg portions 186 includes the inclined legs 192, so that the plastic deformation member 182 is able to undergo plastic deformation in the axial direction with stability, even if the axial compression force is applied to the plastic deformation member 182.

Figure 5:
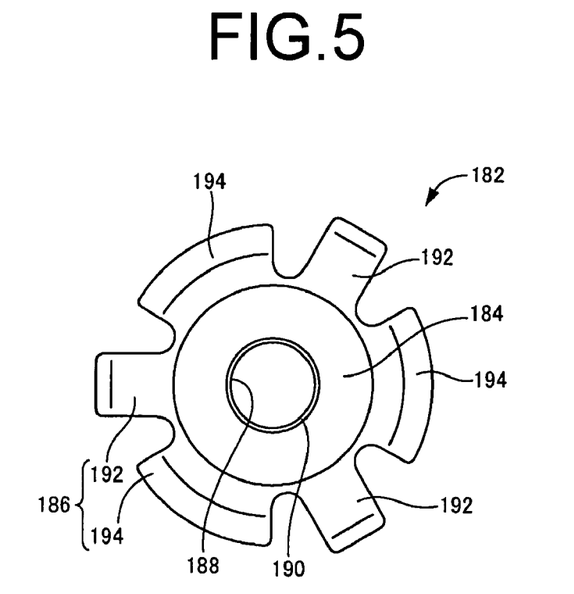
FIG. 5 is a top plane view of the plastic deformation member of the engine mount of FIG. 1.

As shown in FIG. 5, three inclined legs 192 and three stopper legs 194 are formed in the present embodiment, while being arranged in an alternate fashion in the circumferential direction. Circumferentially adjacent inclined legs 192 and the stopper legs 194 are spaced away from one another with a given circumferential intervals, thereby providing gaps between the inclined legs 192 and the stopper legs 194 in the circumferential direction. Thus, where the axial pressing force acts on the plastic deformation member 182, it can be held in the initial fixation state with stability. Further, gaps are formed between adjacent leg portions 186, thereby providing air vent passage. Thus, air chambers formed on the axially opposite sides of the armature 100 are held in communication via the through hole 162 of the armature 100 and the passage formed by the gaps between the leg portions 186. This arrangement makes it possible to prevent generation of air spring by the air chambers on the both sides of the armature 100, which may possibly prevent excitation or deformation of the armature 100.

The spacer member 180 and the plastic deformation member 182 are externally fitted onto the actuating rod 166 with a state mutually superposed in the axial direction, while disposed between the lower end face of the fixation part 168 of the actuating rod 166 and upper end face of the armature 100, which faces opposed in the axial direction.

On the lower end of the actuating rod 166, the positioning nut 176 is tightened, by means of a torque applied thereto, whereby the lower end face of the fixation part 168 and the upper end face of the armature 100 come close to each other in the axial direction. As a result, axial compression force acts on the spacer member 180 and the plastic deformation member 182. Since the spacer member 180 is made of thick walled metallic material and has a high rigidity in comparison with the plastic deformation member 182, while the plastic deformation member 182 has the plurality of leg portions 186 of shapes readily deformable, the plastic deformation member 182 will undergo deformation due to this axial compression force. In the present embodiment, the load concentration will be likely to occur at a boundary between the top wall portion 184 and the leg portions 186.

By tightening the positioning nut 176 sufficiently, the plastic deformation member 182 further undergoes plastic deformation to plastic deformation domain. Thus, the fixation part 168 of the actuating rod 166 and the armature 100 are positioned relative to each other in the axially approaching direction, by means of the spacer member 180 and the plastic deformation member 182. The plastic deformation domain represent a deformation domain where a deformation occurs excess a yield point so that the plastic deformation member 182 will not return to an initial non-deformed state even after the application of load is released.

The actuating rod 166 and the armature 100 are positioned relative to each other in the axial direction by a combination between the positioning nut 176, the spacer member 180 and the plastic deformation member 182. The actuating rod 166 extends through the through hole 162 of the armature 100 in a displaceable fashion, while being forcedly clamped between axially opposite faces of the positioning nut 176 and the plastic deformation member 182. With this arrangement, the actuating rod 166 is assembled with respect to the armature 100 while being displaceable relative to the armature 100 in the axis-perpendicular direction. In the present embodiment, a deformation limiting member 196, which has a generally ring shape and is made of rigid material such as metal, is disposed between the top wall portion 184 of the plastic deformation member 182 and the upper end face of the armature 100, for preventing excessive deformation of the plastic deformation member 182 upon input of a large load.

While the coating layer is applied on the outer circumferential surface of the armature 100, which is adapted to slidable contact with the guide sleeve 122, the same low-friction processing, e.g., an application of a coating layer is also provided on a part of the armature 100, which serves to permit axis-perpendicular displacement of the actuating rod 166 relative to the armature 100. With this arrangement, a pair of slidable-contact faces with low-friction coefficient extending in the axis-perpendicular direction of the armature 100 are formed on the axially upper end face of the armature 100 on which the plastic deformation member 182 is superposed and on the axially lower end face of the shoulder face 164 on which the positioning nut 176 is superposed. Thus, the plastic deformation member 182 and the positioning nut 176 are made readily displaceable relative to the armature 100 in the axis-perpendicular direction by means of the respective slidable-contact faces. Therefore, the oscillation member 64 and the armature 100 are connected together via the actuating rod 166 while being relatively positioned in the axial direction, and being displaceable relative to each other in the axis-perpendicular direction. Described in detail, the coating layer is applied at least on an axially upper end face of the armature 100 as well as an axially lower end face of the shoulder face 164 of the armature 100. Alternatively, a coating layer may be applied on an entire surface of the armature 100.

In operation, with the actuating rod 166 positioned with respect to the armature 100 in the axial direction, the coil 108 is energized. As a result, the armature 100 is excited or oscillated in the axial direction, whereby a given oscillation force is applied to the working fluid chamber 84 via the actuating rod 166 and the oscillation member 64. While not shown in the drawing, in the engine mount 10 having the construction described above, it is possible to control current flow to the coil 108. This control of current flow can be accomplished, for example, by means of adaptive control or other feedback control, using the engine ignition signal of the power unit as a reference signal and the vibration detection signal of the component being damped as an error signal, or on the basis of control data established in advance for a map control. With this arrangement, by producing magnetic force acting on the armature 100 to actuate it downward in the axial direction, and then halting current flow to the coil 108 and allowing the recovery force of the support rubber elastic body 62 to act, it becomes possible to subject the oscillation member 64 to actuating force which corresponds to the vibration being damped. Thus, achieve active vibration damping action by internal pressure control of the pressure receiving chamber 76.

In the engine mount 10 of this embodiment, the upper magnetic action part 158 and the lower magnetic action part 160 of the armature 100 are made of mutually parallel inclined surfaces. Thus, the axial distance between the armature 100 and the upper magnetic pole 118 or the lower magnetic pole 120 varies in the circumferential direction. As a result, magnetic attractive force exerted on the armature 100 varies in the circumferential direction, whereby the resultant force of the axis-perpendicular-directed magnetic force component of magnetic force acting on the armature 100 is produced in one direction in the axis-perpendicular direction where a distance between the upper and lower magnetic action parts 158, 160 and the upper and lower magnetic poles 118, 120 become shortest.

By means of this arrangement, the magnetic force acting in one direction is exerted on the upper and lower ends of the armature 100 (upper and lower magnetic action parts 158, 160), so that tilting of the armature 100 can be reduced. By means of reducing tilting of the armature 100, point contact of the armature 100 with the upper or lower yoke 102, 104 or with the guide sleeve 122 which causes an increase of a contact pressure or sticking can be reduced or avoided, thereby improving operational stability, and ensuring improved durability by preventing uneven wear of the components. Additionally, this arrangement protects any coating layer on the armature 100 so that the low-friction sliding characteristics or corrosion resistance afforded by the coating layer will be exhibited consistently for an extended period.

In this embodiment, the bias urging assembly is provided by effectively utilizing magnetic force generated by the solenoid type actuator (an electromagnetic actuator 90), making it possible to realize a desired deviation biasing mechanism with the reduced number of components and simple construction. Since the bias urging assembly utilizes a magnetic force generated with the coil 108, avoiding a problem of change over time such as fatigue thereof, permitting a stable provision of desired characteristics for a long period of time.

Further, the actuating rod 166 is assembled with the armature 100 while being mutually positioned in the axially approaching direction or twisting direction by means of a combination between the spacer member 180, the plastic deformation member 182 and the positioning nut 176. This makes it possible to effectively avoid damages caused by contact between the actuating rod 166 and the armature 100, while effectively transmitting the driving force in the axial direction produced by the armature 100 to the oscillation member 64 to thereby produce oscillation force.

when an external force (vibration load) is input between the first mounting member 12 and the second mounting member 14, the main rubber elastic body 16 is elastically deformed. This creates the change in volume of the working fluid chamber 84 whose wall is partially defined by the main rubber elastic body 16, thereby increasing the fluid pressure in the working fluid chamber 84. Accordingly, the oscillation member 64 is displaced downward in the axial direction of the mount, and the actuating rod 166 is pressed down in the axially downward direction.

During driving an automobile on a rough road or the like, when a large shock load is applied between the first mounting member 12 and the second mounting member 14, the actuating rod 166 may sometime undergo excess displacement in the axially downward direction, possibly causing problems such as abutting noise and damage of components. To meet this end, a stopper mechanism is necessary to limit an amount of displacement of the actuating rod 166 and the armature 100 fixed to the actuating rod 166. In the present embodiment, the elastic stopper 134 is installed over a specified distance in the axial downward direction of the actuating rod 166, and the first stopper mechanism for limiting the displacement in the axial downward direction of the actuating rod 166 is constituted by the rod stopper unit 138 at the elastic stopper 134. Specifically, when the actuating rod 166 is pressed down more than a specified volume by external force, the bottom end surface of the actuating rod 166 comes into contact with the rod stopper unit 138 formed at a diametrically central portion of the elastic stopper 134. Then, the rod stopper unit 138 formed using a thick walled rubber material undergoes compression deformation between the axially facing surfaces of the actuating rod 166 and the lid member 132, whereby the displacement in the axial direction downward of the actuating rod 166 is limited by shock absorption.

Note that with this embodiment, a plurality of cushion projections 148 are formed respectively on both surfaces in the thickness direction of the rod stopper unit 138. This arrangement makes it possible to avoid the occurrence of abnormal noise or the like due to striking of the actuating rod 166, the lid member 132, and the rod stopper unit 138. Also, the elastic stopper 134 has the same shape on the front and back, and a connection spoke 140 is formed so as to extend facing outward from the center of the thickness direction of the rod stopper unit 138, and a ring shaped sealing unit 136 is formed so as to have its center in the thickness direction on the same plane as the rod stopper unit 138. Then, in a state with the ring shaped sealing unit 136 displaced in the axial downward direction of the mount, and the connection spoke 140 elastically deformed, the elastic stopper 134 is mounted between the lid member 132 and the bottom wall part of the housing 94. With this arrangement, the rod stopper unit 138 is pressed against the lid member 132 side by the elastic resilience of the connection spoke 140, and is stably supported by the lid member 132. Therefore, when the actuating rod 166 is brought into contact with the rod stopper unit 138, it is possible to have stable exhibition of the desired stopper performance.

Furthermore, when a very large shock load is input, the actuating rod 166 will come into contact with the rod stopper unit 138, and sometimes may undergo further displacement in the axially downward direction. The armature stopper units 142 formed on the elastic stopper 134 are positioned downward in the drive direction of the armature 100 with a given distance therebetween, thereby constituting a second stopper mechanism that limit the displacement of the armature 100 in the axially downward direction by means of abutting contact with the armature 100 and the armature stopper units 142. When the actuating rod 166 is pressed down more than a specified amount by an external force, and the armature 100 fixed to the actuating rod 166 is displaced more than a specified volume in the axially downward direction, an elastic abutting unit 152 formed on the radial direction center part of the elastic stopper 134 comes into contact with the bottom edge surface of the armature 100. The elastic abutting unit 152 is compressed between the facing surfaces of the armature 100 and the lid member 132, thereby limiting displacement of the armature 100 in the axially downward direction in a shock absorbing fashion. This arrangement makes it possible to limit the amount of displacement of actuating rod 166 that is positioned with respect to the armature 100 in the axial direction.

In particular with this embodiment, compared to a first separation distance between the actuating rod 166 and the rod stopper unit 138, a second separation distance between the armature 100 and the armature stopper unit 142 (elastic abutting unit 152) is greater. This makes it possible to exhibit in a stepwise fashion an effect of limiting displacement of the actuating rod 166 in the downward direction by means of the first stopper mechanism, and an effect of limiting displacement of the armature 100 in the downward direction by means of the second stopper mechanism. More specifically described, upon input of a shocking external force, the bottom end surface of the actuating rod 166 is brought into contact with the rod stopper unit 138, and the stopper effect by the first stopper mechanism described above is exhibited. Next, when the rod stopper unit 138 undergoes compression deformation greater than a specified volume in the axial direction by means of abutting contact with the actuating rod 166, the bottom edge surface of the armature 100 comes into contact with the elastic abutting unit 152 of the armature stopper unit 142, whereby the stopper effect of the second stopper mechanism described above is provided together with the stopper effect of the first stopper mechanism in the stepwise fashion.

According to this arrangement, the first stopper mechanism which is a preferable major for limiting the displacement of the actuating rod 166 is able to be effected with priority. That is, in comparison with the first stopper mechanism in which the displacement of the actuating rod 166 is limited by the rod stopper unit 138 that is directly brought into abutting contact with the actuating rod 166, the second stopper mechanism indirectly limits the displacement of the actuating rod 166 by means of limiting the displacement of the armature 100. Therefore, the second stopper mechanism may suffer from the problems of a need for a spacer member 180 for ensuring positioning between the actuating rod 166 and the armature 100 in the axially approaching direction, and an input of excess external force to the plastic deformation member 182. In light of this, by exhibiting the stopper effect using the first stopper mechanism with priority, the stopper effect by the second stopper mechanism is used in an auxiliary manner, thereby realizing a stopper constitution with higher reliability.

This embodiment employs the elastic stopper 134 equipped with the ring shaped sealing unit 136, the rod stopper unit 138, and the armature stopper unit 142 together, making it possible to realize limiting of excessive displacement of the actuating rod 166 and the armature 100 as well as a seal between the housing 94 and the lid member 132 with one member. Accordingly, compared to when having a sealing member and a stopper member separately, it is possible to realize both the sealing function and the stopper function with fewer parts.

While the present invention has been described in detail in its presently preferred embodiment, for illustrative purpose only, it is to be understood that the invention is by no means limited to the details of the illustrated embodiment.

For instance, while an example of using the present invention on an automobile engine mount 10 which is a fluid enclosed active vibration damping device has been described in the illustrated embodiment, but the present invention can also be suitably applied to various active vibration damping devices. In specific terms, for example, it is possible to suitably apply the present invention also on an electromagnetic actuator used for an active damping device such as the one shown in JP-A-10-306842.

Also, the sealing projection 144 formed on the ring shaped sealing unit 136 shown with this embodiment is not essential. Specifically, it is acceptable as long as it is possible to obtain the desired sealing performance by sufficiently using grip pressure between the housing 94 and the lid member 132. For instance, it is also possible to simply have the ring shaped sealing unit 136 be thicker walled than the connection spokes 140.

Further, the rod stopper unit 138 does not absolutely have to be a round disk shape. Also, the cushion projection 148 formed as a single unit on the rod stopper unit 138 is effective in terms of preventing abnormal sounds and the like due to shock alleviation. However, it is also acceptable not to have it.

Furthermore, there is no restriction according to the format shown with this embodiment of having the spherical elastic abutting unit 152 and the elastic support unit 154 that couples the elastic abutting unit 152 to the ring shaped sealing unit 136. In specific terms, for example, it is also possible to have the stopper unit be a thick walled plate shape or a block shape or the like. Also, for example, it is possible to form the armature stopper unit so as to extend at the desired length in the circumferential direction in a range that does not interfere with the connection spokes 140.

Also, the spacer member 180 and the plasticity deformation member 182 are nothing more than examples. For example, it is possible to use coil springs or the like instead of the spacer member 180 and the plasticity deformation member 182.

Furthermore, the displacement energization means (magnetic force energization means) that energizes the armature 100 in one direction of the axial perpendicular direction in relation to the stator exhibits excellent effects as described above, but it is also acceptable not to have it. Also, the specific constitution of the electromagnetic actuator 90 is also not to be interpreted as being limited by the notations in this embodiment.

Also, with this embodiment, there are cases when the actuating rod 166 is positioned with the armature 100 in a state slightly at a slope in relation to the excitation direction. Even in this kind of case, since the slope of the actuating rod 166 in relation to the armature 100 is very slight, and since the rod stopper unit 138 is formed having a sufficient planar surface area in the actuating rod 166 displacement downward direction, the stopper effect of limiting the displacement of the actuating rod 166 is effectively exhibited.

It is also to be understood that the present invention may be embodied with various other changes, modifications and improvements, which may occur to those skilled in the art, without departing from the spirit and scope of the invention defined in the following claims.

What is claimed is:

1. An electromagnetic actuator for active vibration damping device, comprising:
    a stator including a cylindrical shaped housing with a bottom wall and a coil member disposed within the housing, the housing having an adjustment hole open in a center of the bottom wall;
    a lid member attached onto the housing so as to cover the adjustment hole;
    a movable member disposed in a central hole of the coil member so as to be movable in an axial direction, the movable member having an insertion through hole formed piercing on a central axis thereof;
    a coupling rod inserted through the insertion through hole and positioned in the axial direction in relation to the movable member by a fixing member installed at one axial side of the coupling rod and a biasing member installed at an other axial side of the coupling rod so that oscillation force is applied to the coupling rod from the movable member when the coil member is energized; and
    an integrally molded stopper that is formed of a rubber elastic body having a ring shaped sealing unit positioned at an outer periphery part, a first stopper unit positioned at a center part, a coupling unit that mutually couples the ring shaped sealing unit and the first stopper unit, and a plurality of second stopper units located radially between the ring shaped sealing unit and the first stopper unit while being independent from one another in a circumferential direction,
    wherein the integrally molded stopper is superposed and mounted on an inner surface of the lid member such that the ring shaped sealing unit is compressed between the bottom wall of the housing and the lid member to thereby form a sealing mechanism that fluid-tightly close an opening of the adjustment hole, that the first stopper unit is arranged facing in the axial direction to a bottom end of the coupling rod with a first separation distance between axially facing surfaces of the first stopper unit and the coupling rod, that the second stopper units are arranged facing in the axial direction to a bottom edge surface of the movable member with a second separation distance between axially facing surfaces of the second stopper units and the movable member, and that the second separation distance is greater than the first separation distance.

2. The electromagnetic actuator according to claim 1, wherein the ring shaped sealing unit, the coupling unit, and the second stopper units formed aligning on a plane spreading radially outwardly from a center in a thickness direction of an outer circumferential surface of the first stopper, and the integrally molded stopper is mounted in a state with the ring shaped sealing unit displaced to one side in the thickness direction of the first stopper unit.

3. The electromagnetic actuator according to claim 1, wherein each of the second stopper units comprises an elastic abutting unit disposed axially beneath the movable member, and an elastic support unit extending diametrically inwardly from the ring shaped sealing unit for elastically connecting the elastic abutting unit with respect to the ring shaped sealing unit.

4. The electromagnetic actuator according to claim 3, wherein the elastic abutting unit has a wall thickness greater than that of the elastic support unit, and is supported in a cantilevered state by the ring shaped sealing unit via the elastic support unit.

5. The electromagnetic actuator according to claim 1, wherein the coupling unit comprises spoke units radially extending at a plurality of circumferential locations to have the first stopper unit and the ring shaped sealing unit coupled integrally by the spoke units, wherein adjacent ones of the spoke units are circumferentially spaced from one another via hollow parts formed therebetween, and wherein the second stopper units are positioned at centers in the circumferential direction of the hollow parts, respectively.

6. The electromagnetic actuator according to claim 1, wherein the first stopper unit has a thickness dimension greater than those of any of the ring shaped sealing unit, the coupling unit, and the second stopper unit.

* * * * *